US011932922B2

United States Patent
Peguet et al.

(10) Patent No.: US 11,932,922 B2
(45) Date of Patent: Mar. 19, 2024

(54) STRIP OF ALUMINIUM ALLOY FOR MANUFACTURING BRAZED HEAT EXCHANGERS

(71) Applicant: CONSTELLIUM NEUF-BRISACH, Biesheim (FR)

(72) Inventors: Lionel Peguet, Quaix en Chartreuse (FR); Bechir Chehab, Voiron (FR)

(73) Assignee: CONSTELLIUM NEUF-BRISACH (FR)

( * ) Notice: Subject to any disclaimer, the term of this patent is extended or adjusted under 35 U.S.C. 154(b) by 0 days.

(21) Appl. No.: 17/436,003

(22) PCT Filed: Feb. 27, 2020

(86) PCT No.: PCT/FR2020/050389
§ 371 (c)(1),
(2) Date: Sep. 2, 2021

(87) PCT Pub. No.: WO2020/178507
PCT Pub. Date: Sep. 10, 2020

(65) Prior Publication Data
US 2022/0145432 A1    May 12, 2022

(30) Foreign Application Priority Data

Mar. 4, 2019 (FR) ........................ 1902177
Mar. 5, 2019 (FR) ........................ 1902257

(51) Int. Cl.
*B23B 15/00* (2006.01)
*B23K 1/00* (2006.01)
(Continued)

(52) U.S. Cl.
CPC ............ *C22C 21/00* (2013.01); *B23K 1/0012* (2013.01); *C21D 8/0226* (2013.01);
(Continued)

(58) Field of Classification Search
None
See application file for complete search history.

(56) References Cited

U.S. PATENT DOCUMENTS

| 5,125,452 A | 6/1992 | Yamauchi et al. |
| 5,350,436 A | 9/1994 | Takezoe et al. |

(Continued)

FOREIGN PATENT DOCUMENTS

| EP | 0326337 A1 | 8/1989 |
| EP | 0718072 A1 | 6/1996 |

(Continued)

OTHER PUBLICATIONS

International Search Report for International Patent Application No. PCT/FR2020/050389 dated Jul. 16, 2020.
(Continued)

*Primary Examiner* — Daniel J. Schleis
(74) *Attorney, Agent, or Firm* — McBee Moore & Vanik IP, LLC

(57) ABSTRACT

A strip intended for the manufacture of brazed heat exchangers, having a core made of an aluminium alloy with the composition (weight %):
Si: 0.10-0.30%, preferably 0.15-0.25%
Fe<0.20%
Cu: 0.75-1.05%, preferably 0.75-1.02%, more preferably 0.75-1.0%
Mn: 1.2-1.7%, preferably 1.2-1.55%, more preferably 1.25-1.4%
Mg<0.03% preferably <0.025%, more preferably <0.015%
Zn<0.1%
Ti<0.15%
other elements <0.05% each and <0.15% in total,
remainder aluminium.

18 Claims, 2 Drawing Sheets

(51) Int. Cl.
  *C21D 8/02* (2006.01)
  *C22C 21/00* (2006.01)
  *C22F 1/04* (2006.01)
  *C23C 28/02* (2006.01)
  *F28F 21/08* (2006.01)

(52) U.S. Cl.
  CPC ......... *C21D 8/0236* (2013.01); *C21D 8/0273* (2013.01); *C22F 1/04* (2013.01); *C23C 28/021* (2013.01); *F28F 21/089* (2013.01)

(56) References Cited

U.S. PATENT DOCUMENTS

| | | | |
|---|---|---|---|
| 6,019,939 A | 2/2000 | Gray et al. | |
| 7,135,239 B2* | 11/2006 | Rajagopalan | F28F 21/084 |
| | | | 138/143 |
| 9,546,829 B2 | 1/2017 | Howells et al. | |
| 10,006,724 B2 | 6/2018 | Perrier et al. | |
| 2008/0011816 A1* | 1/2008 | Kilmer | F28F 21/089 |
| | | | 228/262.51 |
| 2015/0165564 A1* | 6/2015 | Ahl | B23K 1/0012 |
| | | | 228/101 |
| 2018/0200843 A1* | 7/2018 | Matsukado | B23K 35/0238 |
| 2018/0214990 A1* | 8/2018 | Kimura | C22C 21/02 |
| 2021/0114144 A1 | 4/2021 | Chehab et al. | |
| 2021/0170532 A1 | 6/2021 | Chehab et al. | |

FOREIGN PATENT DOCUMENTS

| | | |
|---|---|---|
| EP | 1075935 A1 | 2/2001 |
| EP | 1413427 A2 | 4/2004 |
| FR | 2975402 A1 | 11/2012 |
| FR | 3074717 A1 | 6/2019 |
| FR | 3080058 A1 | 10/2019 |
| GB | 2321869 A | 8/1998 |
| JP | H10298686 A | 11/1998 |
| JP | 2000167688 A | 6/2000 |
| WO | 199422633 A1 | 10/1994 |
| WO | 2005118899 A1 | 12/2005 |
| WO | 2014165017 A2 | 10/2014 |
| WO | 2015132482 A1 | 9/2015 |

OTHER PUBLICATIONS

French Search Report for French patent Application No. 1902257 dated Nov. 28, 2019.

* cited by examiner

[Fig. 1]
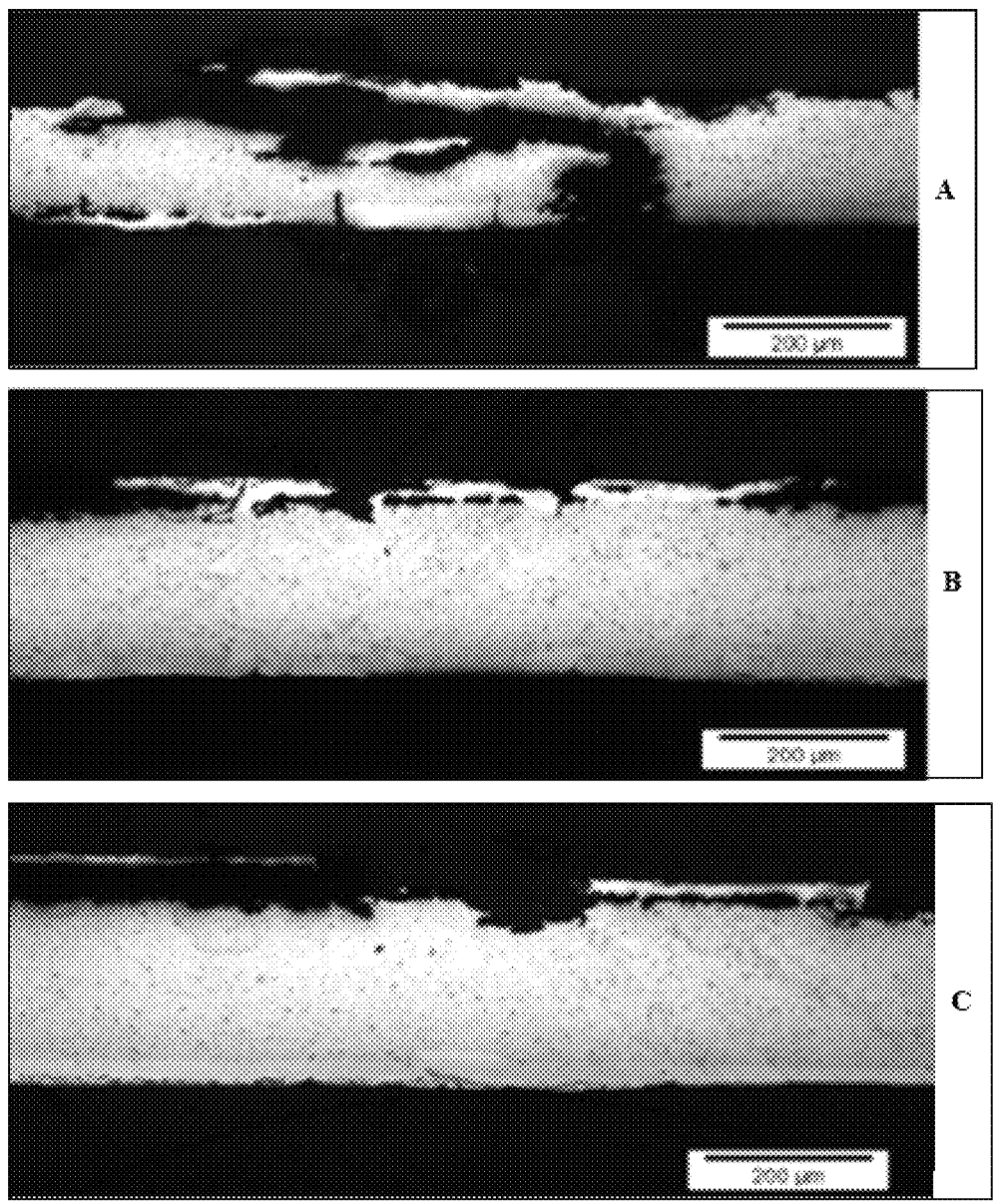

[Fig. 2]
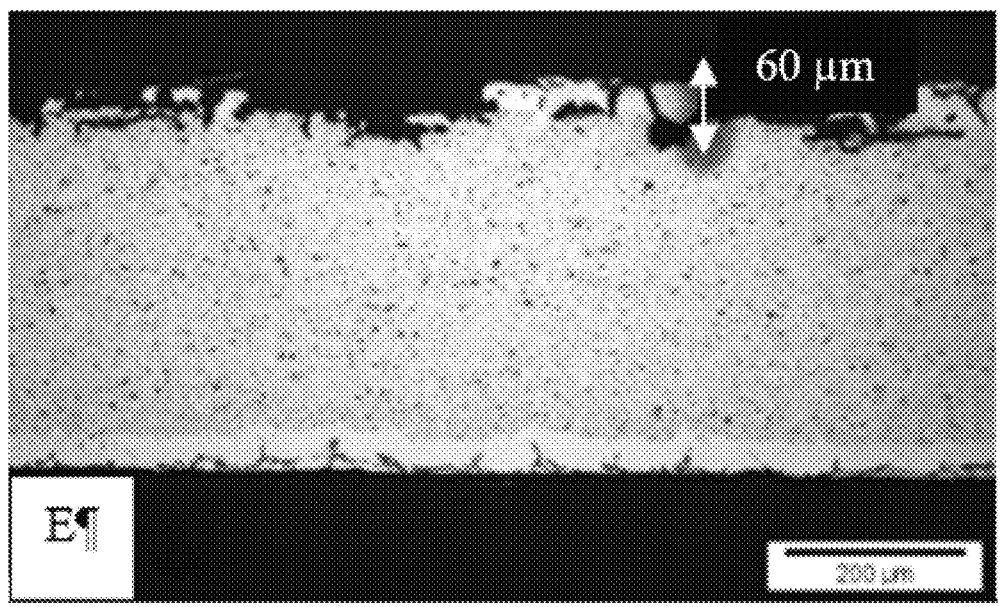
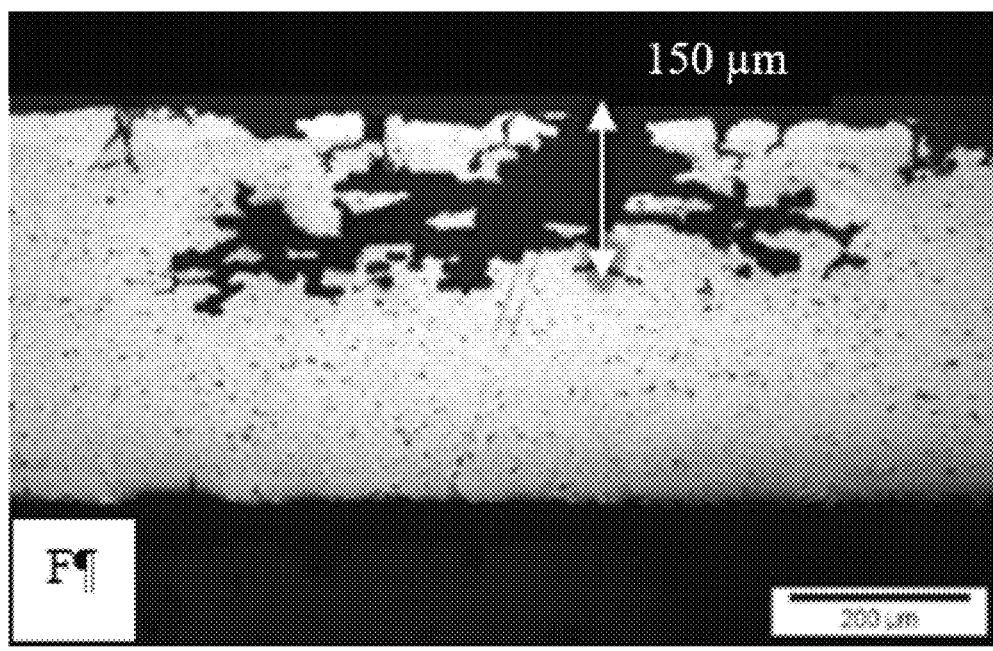

STRIP OF ALUMINIUM ALLOY FOR MANUFACTURING BRAZED HEAT EXCHANGERS

CROSS-REFERENCE TO RELATED APPLICATIONS

This application is the National Stage entry of International Application No. PCT/FR2020/050389, filed 27 Feb. 2020, which claims priority to French Patent Application No. 1902177, filed 4 Mar. 2019 and French Patent Application No. 1902257, filed 5 Mar. 2019.

BACKGROUND

Field

FIELD OF THE INVENTION

The invention relates to thin strips (with a thickness generally comprised from 0.05 to 3 mm, preferably from 0.15 to 2.5 mm) of an aluminium-manganese core alloy (3000 series according to the nomenclature of the Aluminium Association), optionally cladded on one or two face(s) with a coverage alloy, most often an aluminium-silicon brazing alloy (4000 series according to the nomenclature of the Aluminium Association) and/or an interlayer alloy, placed between the core and the optional brazing alloy, made of an aluminium-manganese alloy (3000 series according to the nomenclature of the Aluminium Association). In particular, these strips are intended for the manufacture of elements, such as tubes, collectors and plates, of heat exchangers assembled by brazing. In particular, these heat exchangers are found in engine cooling and passenger compartment air-conditioning systems of motor vehicles. The techniques for brazing aluminium alloys are described for example in the article of J. C. Kucza, A. Uhry and J. C. Goussain "Le brasage fort de ('aluminium et ses alliages", published in Soudage et Techniques Connexes, November-December 1991, pp. 18-29. In particular, the strips according to the invention may be used in non-corrosive flux brazing techniques of the type NOCOLOK® or CAB (controlled atmosphere brazing), or else, according to one variant, in fluxless brazing techniques.

Description of Related Art

The required properties of aluminium alloy strips used for the manufacture of brazed heat exchangers are in particular a good brazability, a high mechanical strength after brazing, so as to use thicknesses that are as small as possible, a formability that is sufficient for an easy forming of the tubes, fins, collectors and plates, before brazing, and a good corrosion resistance. Of course, it is important that the selected alloy is easy to cast and roll, and that the manufacturing cost of the strips is compatible with the requirements of the automotive industry.

A used alloy is the 3003 with the composition (weight % according to the standard EN 573-3):

| Si < 0.6% | Fe < 0.7% | Cu: 0.05-0.20% | Mn: 1.0-1.5% | Zn < 0.10% |

Other elements <0.05% each and <0.15% in total, remainder aluminium.

Numerous alloys have been suggested to improve either one of the aforementioned use properties, more particularly the corrosion resistance, thereby the name of "long-life" alloys that is sometimes given thereto in the industry.

The U.S. Pat. No. 5,125,452 (Sumitomo Light Metal Industries et Nippondenso) describes cladded strips whose base alloy has as a composition:

| Si < 0.1 | Fe < 0.3 | Cu: 0.05-0.35 | Mn: 0.3-1.5 | Mg: 0.05-0.5 |
| Ti: 0.05-0.35 | with Cu − 0.2 < Mg < Cu + 0.2. | | | |

The patent EP 0326337 (Alcan International) describes a cladded strip whose base alloy has as a composition:

| Si < 0.15 | Fe < 0.4 | Cu: 0.1-0.6 | Mn: 0.7-1.5 | Mg < 0.8. |

The low Si content, preferably <0.05%, enables the formation of a layer rich with Mn precipitates, which could serve as a barrier to the diffusion of silicon of the coating alloy, and increases the corrosion resistance. WO 94/22633 is a variant of the previous one which differs only by a higher Cu content (0.6-0.9%).

The U.S. Pat. No. 5,350,436 (Kobe Alcoa and Nippondenso) describes an alloy based on the composition: Si: 0.3-1.3 Cu<0.2 Mn: 0.3-1.5 Mg<0.2 Ti: 0.02-0.3 Fe not mentioned.

While not being bound by theory, it seems that the high Si content (0.8% in the examples) allows compensating for the absence of Cu and Mg for the mechanical strength, the presence of Ti contributes to a good corrosion resistance and the absence of Mg promotes a good brazability.

The patent EP 0718072 (Hoogovens Aluminium Walzprodukte) describes an alloy based on the composition: Si>0.15 Fe<0.8 Cu: 0.2-2 Mn: 0.7-1.5 Mg: 0.1-0.6 with Cu+Mg<0.7 and optional addition of Ti, Cr, Zr or V. The examples feature Si contents of 0.5%.

The patent JP 2000167688 (Sumitomo Light Metal Ind) discloses an aluminium core alloy comprising, in weight percentages, from 0.5 to 2.0% of Mn, from 0.1 to 1.0% of Cu, <=0.1% of Si, <=0.3% of Fe, from 0.06 to 0.35% of Ti, <=0.04% of Mg and unavoidable impurities, the remainder consisting of aluminium.

When trying to sum up the teaching of the state of the art for this type of alloys, it should be noticed that a first category of alloys has a very low Si content (<0.15 and preferably <0.05%) accompanied, or not, with a low Fe content, but, in any case, less stringent than for Si. These very low Si contents (<0.05%) can be obtained only when starting from pure bases, which increases the manufacturing costs. Calling into question the need for a very low Si content to obtain a good corrosion resistance, a second category of alloys features, on the contrary, a rather high Si content (0.5 to 0.8%), possibly to compensate for the loss of mechanical strength related to low contents of hardening elements Mg and Cu. Indeed, for flux brazing, it is known that the Mg content should be reduced, to limit the migration of Mg at the surface of the cladding layer, which leads to the formation of a thick layer of MgO oxide. The presence of this oxide imposes increasing the amount of flux on the surfaces to be brazed, which increases the cost of the assembly and deteriorates the surface aspect. Other references still target an intermediate Si content (cf. for example EP1075935, EP1413427, EP2969308, or U.S. Pat. No. 9,546,829).

As regards the element Cu, its effect on the corrosion resistance seems to be controversial. Some references do not recommend using a Cu amount that is too high (cf. in particular the U.S. Pat. No. 6,019,939 of Alcan International Limited).

Given the increasing demand of the market, there is still a need for a new core alloy having an improved corrosion resistance in comparison with the existing alloys, yet without degrading the mechanical strength or the brazability. Such a core alloy could allow addressing the persistent demand for reducing the thickness of the products.

SUMMARY

Surprisingly, the Applicant has determined a composition domain allowing improving the corrosion resistance without any degradation of the mechanical strength or of the brazability.

Thus, an object of the invention is a strip intended for the manufacture of brazed heat exchangers, having a core made of an aluminium alloy with the composition (weight %):
  Si: 0.10-0.30%, preferably 0.15-0.25%
  Fe<0.20%
  Cu: 0.75-1.05%, preferably 0.75-1.02%, more preferably 0.75-1.0%
  Mn: 1.2-1.7%, preferably 1.2-1.55%, more preferably 1.25-1.4%
  Mg<0.03% preferably <0.025%, more preferably <0.015%
  Zn<0.1%
  Ti<0.15%
  other elements <0.05% each and <0.15% in total,
  remainder aluminium.

Another object of the invention is a method for manufacturing a strip, comprising the successive steps of:
  casting of a plate made of the core alloy;
  optional cladding with at least one brazing aluminium alloy and optionally at least one interlayer aluminium alloy;
  preheating at a temperature from 450 to 520° C. preferably with holding at the maximum temperature for less than 12 hours, more preferably for less than 3 h;
  hot rolling of this plate without prior homogenisation at a temperature from 450 to 520° C. down to a thickness from 2 to 6 mm;
  cold rolling to the desired thickness, the thickness of the strip after cold rolling being preferably from 0.15 to 3 mm and
  annealing at a temperature from 240 to 450° C., preferably from 240 to 380° C., with holding at the maximum temperature for 10 minutes to 15 hours, preferably for 20 minutes to 3 hours.

According to one variant, another object of the invention is a method for manufacturing a strip according to the present invention, comprising the successive steps of:
  casting of a plate made of the core alloy;
  homogenisation of this plate at a temperature from 580 to 630° C. for 1 to 24 hours;
  optional cladding with at least one brazing aluminium alloy and optionally at least one interlayer aluminium alloy;
  preheating at a temperature from 450 to 520° C. preferably with holding at the maximum temperature for less than 12 hours, more preferably for less than 3 h;
  hot rolling of this homogenised and optionally cladded plate at a temperature from 450 to 520° C. down to a thickness from 2 to 6 mm;
  cold rolling to the desired thickness, the thickness of the strip after cold rolling being preferably from 0.15 to 3 mm and
  annealing at a temperature from 240 to 450° C., preferably from 240 to 380° C., with holding at the maximum temperature for 10 minutes to 15 hours, preferably for 20 minutes to 3 hours.

Another object of the invention is a heat exchanger made at least partially from a strip according to the present invention.

Another object of the invention is the use of a strip according to the present invention, for the manufacture of a heat exchanger, said strip having an improved corrosion resistance without any degradation of the mechanical strength or of the brazability.

BRIEF DESCRIPTION OF THE DRAWINGS

FIGS. 1-2 depict embodiments as described herein.

DETAILED DESCRIPTION OF A PREFERRED EMBODIMENT

FIG. 1 represents the sectional micrographs of the strips after the SWAAT test (ASTM G85A3) for the samples of Example 1, after four weeks of exposure. The deepest corrosion sites are represented. The marking A corresponds to the sample having a core alloy A (prior art). The marking B corresponds to the sample having a core alloy B (according to the invention). The marking C corresponds to the sample having a core alloy C (according to the invention).

FIG. 2 represents the sectional micrographs of the strips after the SWAAT test for the samples of Example 2, after two weeks of exposure. The marking E corresponds to the sample having a core alloy E (according to the invention). The marking F corresponds to the sample having a core alloy F (prior art).

In the description and the claims, unless stated otherwise:
  the designation of the aluminium alloys is compliant with the nomenclature of The Aluminium Association;
  the contents of the chemical elements are designated in weight percentages.

The strip according to the invention comprises a core made of an aluminium alloy with the composition (weight %):
  Si: 0.10-0.30%, preferably 0.15-0.25%
  Fe<0.20%
  Cu: 0.75-1.05%, preferably 0.75-1.02%, more preferably 0.75-1.0%
  Mn: 1.2-1.7%, preferably 1.2-1.55%, more preferably 1.25-1.4%
  Mg<0.03% preferably <0.025%, more preferably <0.015%
  Zn<0.1%
  Ti<0.15%
  other elements <0.05% each and <0.15% in total,
  remainder aluminium.

The composition limits of the core alloy may be justified as follows.

A minimum silicon content of 0.10% allows avoiding the use of a pure base, whose cost is high. Moreover, in the alloys containing magnesium, silicon contributes to the mechanical strength through the formation of $Mg_2Si$ precipitates. Beyond 0.30%, silicon may have a detrimental effect on the corrosion resistance, because of the formation of manganese dispersoids AlMnSi and AlMnFeSi.

An iron content limited to less than 0.25% also promotes the corrosion resistance and the formability, but it is not necessary to descend to very low contents <0.15% which would lead to high cost prices.

Copper is a hardening element that contributes to mechanical strength, but beyond 1.1%, coarse intermetallic compounds are formed upon casting which are detrimental to the homogeneity of the metal and form corrosion primer sites.

Manganese is within limits close to those of the alloy 3003; it contributes to the mechanical strength and to the corrosion resistance.

A limited addition of zinc may have a beneficial effect on the corrosion resistance, by modifying the electrochemical mechanisms, in particular for most copper-charged alloys. However, it should remain below 0.2% to avoid an excessive generalised susceptibility to corrosion.

Preferably, the core alloy comprises less than 0.1% of Ti. Preferably, the core alloy comprises at least 0.05%, more preferably at least 0.06% of Ti.

Brazing Aluminium Alloy

The strips according to the present invention have a thickness generally comprised from 0.05 to 3 mm, preferably 0.15 to 2.5 mm, depending on the type of manufactured part, and may be cladded with a coverage alloy, which may be either a brazing alloy, or an alloy serving as a sacrificial anode to protect the part from corrosion such as a zinc alloy like the alloy AA7072.

According to a variant of the present invention, the brazing aluminium alloy does not comprise an intentional addition of Zn, Zn then being preferably present according to an amount corresponding to impurities, namely lower than 0.05 weight %.

The brazing alloy is from the 4xxx alloy family with a liquidus temperature that is low enough in comparison with the solidus of the core alloy to have a sufficient temperature interval for brazing, an acceptable mechanical strength and a good wettability. These alloys may contain addition elements, for example strontium.

Preferably, the strip according to the present invention is cladded on one or two face(s) with a brazing aluminium alloy, preferably a 4xxx alloy comprising from 4 to 13%, preferably from 6 to 11 weight % of Si and up to 0.5%, preferably up to 0.3 weight % of Fe.

Preferably, the brazing aluminium alloy comprises (weight %):
Si: from 5 to 13%;
Fe: up to 1%;
Cu: up to 0.4%, preferably up to 0.1%;
Mn: up to 0.2%, preferably up to 0.1%;
Mg: up to 0.3%, preferably up to 0.1%;
Zn: up to 0.2%, preferably up to 0.1%;
Ti: up to 0.30%, preferably up to 0.1%;
other elements: lower than 0.05% each and lower than 0.15% in total;
remainder aluminium.

As an example, the composition AA4045 is an aluminium alloy that could be suitable as a brazing alloy according to the present invention. Its composition is, in weight %: from 9 to 11% of Si, up to 0.8% of Fe, up to 0.30% of Cu, up to 0.05% of Mn, up to 0.05% of Mg, up to 0.10% of Zn, up to 0.20% of Ti, other elements lower than 0.05% each and lower than 0.15% in total, the remainder consisting of aluminium.

As an example, the previous composition preferably comprises up to 0.6% of Fe.

As an example, the previous composition preferably comprises up to 0.1% of Cu.

As an example, the composition AA4343 is an aluminium alloy that could be suitable as a brazing alloy according to the present invention. Its composition is, in weight %: from 6.8 to 8.2% of Si, up to 0.8% of Fe, up to 0.25% of Cu, up to 0.10% of Mn, up to 0.05% of Mg, other elements lower than 0.05% each and lower than 0.15% in total, the remainder consisting of aluminium.

As an example, the previous composition preferably comprises up to 0.3% of Fe.

As an example, the previous composition preferably comprises up to 0.1% of Cu.

Preferably, the brazing alloy according to the present invention comprises no Mg.

It is also possible to use as a cladding, on one of the faces, an aluminium alloy with a sacrificial anode effect, in particular an alloy containing zinc, such as the alloy AA7072.

Interlayer Aluminium Alloy

Preferably, the strip according to the present invention is cladded on one or two face(s) with a so-called interlayer aluminium alloy, placed between the core and the optional brazing alloy, preferably comprising (in weight %):
Si: up to 0.5%, more preferably up to 0.2%;
Fe: up to 0.7%, more preferably up to 0.3%, still more preferably up to 0.2%;
Mn: from 0.3 to 1.4%, more preferably from 0.6 to 0.8%, according to one variant between 1 and 1.3%;
Cu: up to 0.3%, preferably up to 0.1%, still more preferably up to 0.05%;
other elements <0.05% each and <0.15% in total;
remainder aluminium.

Preferably, the interlayer aluminium alloy of the strip according to the present invention comprises (weight %): Si<0.15%; Fe<0.2%; Cu<0.1%; Mn from 0.6 to 0.8%; Mg<0.02%; other elements <0.05% and <0.15% in total, remainder aluminium.

Preferably, the interlayer aluminium alloy is an alloy from the AA3xxx series.

Strip

The strip according to the present invention is a so-called brazing strip, which may serve in the manufacture of different portions of a heat exchanger, for examples tubes, plates, collectors, etc.

Method

Another object of the invention is a method for manufacturing a strip, comprising the following steps of:
casting of a plate made of the core alloy;
optional cladding with at least one brazing aluminium alloy and optionally at least one interlayer aluminium alloy;
preheating at a temperature from 450 to 520° C. preferably with holding at the maximum temperature for less than 12 hours, more preferably for less than 3 h;
hot rolling without prior homogenisation at a temperature from 450 to 520° C. down to a thickness from 2 to 6 mm;
cold rolling to the desired thickness, the thickness of the strip after cold rolling being preferably from 0.15 to 3 mm and
annealing at a temperature from 240 to 450° C., preferably from 240 to 380° C., with holding at the maximum temperature for 10 minutes to 15 hours, preferably for 20 minutes to 3 hours.

According to one variant, another object of the invention is a method for manufacturing a strip according to the present invention, comprising the following steps of:

casting of a plate made of the core alloy;

homogenisation of this plate at a temperature from 580 to 630° C. for 1 to 24 hours;

optional cladding with at least one brazing aluminium alloy and optionally at least one interlayer aluminium alloy;

preheating at a temperature from 450 to 520° C. preferably with holding at the maximum temperature for less than 12 hours, more preferably for less than 3 h;

hot rolling of this homogenised and optionally cladded plate at a temperature from 450 to 520° C. down to a thickness from 2 to 6 mm;

cold rolling to the desired thickness, the thickness of the strip after cold rolling being preferably from 0.15 to 3 mm and annealing at a temperature from 240 to 450° C., preferably from 240 to 380° C., with holding at the maximum temperature for 10 minutes to 15 hours, preferably for 20 minutes to 3 hours.

Preferably, there is no intermediate annealing in the methods according to the present invention.

When it is intended for parts with a substantial forming, the strip may be used in the annealed temper (O temper) by proceeding with a final annealing at a temperature comprised between 320 and 380° C., in a continuous furnace or in a batch furnace. This annealing leads to the recrystallisation of the alloy and improves the formability. In the other cases, it is used in the hardened state, which leads to a better mechanical strength, for example a H14 or H24 temper (according to the standard NF EN 515), this last temper being obtained through a recovery annealing between 250 and 300° C., avoiding recrystallisation.

Before installing the cladding material, it is possible to proceed with a homogenisation of the core alloy plate at a temperature comprised from 580 to 630° C. This homogenisation promotes the ductility of the rolled strip and it is recommended when the strip is used in the O temper. It promotes the coalescence of dispersoids with Mn.

Use

Another object of the invention is a heat exchanger made at least partially from a strip according to the present invention.

Another object of the invention is the use of a strip according to the present invention, for the manufacture of a heat exchanger, said strip having an improved corrosion resistance without any degradation of the mechanical strength or of the brazability.

The strips according to the present invention may be used in the manufacture of radiators, in particular for motor vehicles, such as engine cooling radiators, oil radiators, heating radiators and intercoolers, as well as in air-conditioning systems.

EXAMPLES

Example 1

Four alloys have been cast, whose compositions are given in Table 1 hereinafter in weight percentages. The alloy A is a core alloy according to the prior art. The alloys B and C are core alloys according to the present invention. The alloy D is a brazing alloy AA4343.

TABLE 1

| Alloy | Si | Fe | Cu | Mn | Mg | Ti |
|-------|------|------|-------|-------|-------|-------|
| A | 0.19 | 0.15 | 0.67 | 1.34 | 0.008 | — |
| B | 0.21 | 0.15 | 0.79 | 1.35 | 0.001 | — |
| C | 0.21 | 0.16 | 1.02 | 1.35 | 0.001 | — |
| D | 7.11 | 0.21 | <0.01 | <0.02 | 0.015 | 0.016 |

The alloys described in Table 1 hereinbefore have been used to form three-layer sandwiches having an overall thickness of 220 µm, according to the following configuration:

brazing alloy (alloy D—10% of the overall thickness)
core alloy (alloy A, B or C—80% of the overall thickness)
brazing alloy (alloy D—10% of the overall thickness)

After casting and assembly of the layers, the sandwiches have been pre-heated up to 500° C. and hot rolled at this temperature down to an overall thickness of 3.5 mm. Afterwards, the sandwiches have been cold rolled without any intermediate annealing down to an overall thickness of 220 µm. Finally, the obtained strips have been subjected to a recovery annealing to obtain a H24 metallurgical temper, at 240° C. for 2 hours.

Afterwards, a brazing has been carried out in a Camlaw furnace for 2 minutes at 600° C.

On the sandwiches obtained in this manner, the pitting depth has been determined using the SWAAT test (sea water acetic acid test) according to the standard ASTM G85A3, followed by a micrographic observation with the optical microscope (magnification ×100) after four weeks of exposure. The results are represented in FIG. 1.

FIG. 1 shows that the core alloys according to the present invention allow improving the corrosion resistance in comparison with the core alloy according to the prior art.

Besides, the mechanical strengths after brazing the alloys A, B and C described in Table 1 hereinbefore have been measured according to the standard ISO 6892-1. The obtained results are reported in Table 2 hereinafter.

TABLE 2

| Alloy | $Rp_{0.2}$ (MPa) | Rm (MPa) |
|-------|------|------|
| A | 58 | 165 |
| B | 57 | 164 |
| C | 59 | 172 |

According to Table 2 hereinbefore, the core alloy according to the present invention features mechanical strengths in the same order of magnitude, and even improved in comparison with the core alloy of the prior art.

Example 2

Three alloys have been cast, whose compositions are reported in Table 3 hereinafter in weight percentages. The alloy E is a core alloy according to the present invention. The alloy F is a core alloy according to the prior art. The alloy D is a brazing alloy AA4343.

TABLE 3

| Alloy | Si | Fe | Cu | Mn | Mg | Ti |
|-------|------|------|-------|-------|-------|-------|
| E | 0.24 | 0.10 | 0.81 | 1.31 | 0.026 | 0.10 |
| F | 0.21 | 0.15 | 0.66 | 1.27 | 0.027 | 0.08 |
| D | 7.11 | 0.21 | <0.01 | <0.02 | 0.015 | 0.016 |

The alloys described in Table 3 hereinbefore have been used to form three-layer sandwiches having an overall thickness of 400 μm, according to the following configuration:
brazing alloy (alloy D—7.5% of the overall thickness)
core alloy (alloy E or F—85% of the overall thickness)
brazing alloy (alloy D—7.5% of the overall thickness)

After casting, homogenisation and assembly of the layers, the sandwiches have been pre-heated up to 500° C. and hot rolled at this temperature down to an overall thickness of 3.5 mm. Afterwards, the sandwiches have been cold rolled without any intermediate annealing down to an overall thickness of 400 μm. Finally, the obtained strips have been subjected to an annealing to obtain an 0 metallurgical temper, at 360° C. for 1 hour.

Afterwards, a brazing has been carried out in a Camlaw furnace for 2 minutes at 600° C.

On the sandwiches obtained in this manner, the pitting depth has been determined using the SWAAT test (sea water acetic acid test) according to the standard ASTM G85A3, followed by a micrographic observation with the optical microscope (magnification ×100) after two weeks of exposure. The results are represented in FIG. 2.

FIG. 2 shows that the core alloy according to the present invention (comprising in particular Cu from 0.75 to 1.05%) allows improving the corrosion resistance in comparison with the core alloy according to the prior art.

The invention claimed is:

1. A strip intended for manufacture of brazed heat exchangers, having a core comprising an aluminium alloy with the composition in weight %:
Si: 0.10-0.30%
Fe<0.20%
Cu: 0.75-1.05%
Mn: 1.25-1.4%,
Mg<0.03%
Zn<0.1%
Ti<0.15%
other elements <0.05% each and <0.15% in total,
remainder aluminium;
the strip is cladded on one or two face(s) with a coverage alloy, wherein the coverage alloy is a brazing aluminium alloy or an alloy serving as a sacrificial anode to protect the part from corrosion;
the brazing alloy comprises in weight %:
Si: from 5 to 13%;
Fe: up to 1%;
Cu: up to 0.4%;
Mn: up to 0.2%;
Mg: up to 0.3%;
Zn: up to 0.2%;
Ti: up to 0.30%;
other elements: lower than 0.05% each and lower than 0.15% in total;
remainder aluminium;
the sacrificial anode is alloy AA7072.

2. The strip according to claim 1, which is cladded on one or two face(s) with an interlayer aluminium alloy, placed between the core and the brazing aluminium alloy.

3. The strip according to claim 2, wherein the interlayer aluminium alloy comprises in weight %: Si<0.15%; Fe<0.2%; Cu<0.1%; Mn from 0.6 to 0.8%; Mg<0.02%; other elements <0.05% and <0.15% in total, remainder aluminium.

4. A heat exchanger made at least partially from the strip according to claim 1.

5. A product comprising a strip according to claim 1, for manufacture of a heat exchanger, said strip having an improved corrosion resistance without any degradation of the mechanical strength or of the brazability as compared to at least one other strip.

6. The strip according to claim 1, wherein the core comprising an aluminium alloy comprises in weight %:
Si: 0.15-0.25%
Cu: 0.75-1.02%;
Mn: 1.25-1.4%; and
Mg: <0.025%.

7. The strip according to claim 6, wherein the core comprising an aluminium alloy comprises in weight %:
Cu: 0.75-1.0%; and
Mg: <0.015%.

8. The strip according to claim 1, wherein the brazing aluminium alloy comprises a 4xxx alloy comprising from 4 to 13 weight % of Si and up to 0.5 weight % of Fe.

9. The strip according to claim 1, wherein the brazing aluminium alloy comprises a 4xxx alloy comprising from 6 to 11 weight % of Si and up to 0.3 weight % of Fe.

10. The strip according to claim 2, wherein the interlayer aluminium alloy comprises in in weight %:
Si: up to 0.5%;
Fe: up to 0.7%;
Mn: from 0.3 to 1.4%;
Cu: up to 0.3%;
other elements <0.05% each and <0.15% in total;
remainder aluminium.

11. The strip according to claim 2, wherein the interlayer aluminium alloy comprises in in weight %:
Si: up to 0.2%;
Fe: up to 0.3%;
Mn: from 1 to 1.3%;
Cu: up to 0.1%;
other elements <0.05% each and <0.15% in total;
remainder aluminium.

12. The strip according to claim 11, wherein the interlayer aluminium alloy comprises in Min weight %:
Fe: up to 0.2%;
Mn: from 0.6 to 0.8%;
Cu: up to 0.05%.

13. A method for manufacturing a strip according to claim 1, comprising successively:
casting of a plate comprising the core alloy;
preheating at a temperature from 450 to 520° C.;
hot rolling of said plate without prior homogenisation at a temperature from 450 to 520° C. down to a thickness from 2 to 6 mm;
cold rolling to a desired thickness and
annealing at a temperature from 240 to 450° C., with holding at the maximum temperature for 10 minutes to 15 hours.

14. A method for manufacturing a strip according to claim 1, comprising successively:
casting of a plate comprising the core alloy;
homogenisation of said plate at a temperature from 580 to 630° C. for 1 to 24 hours;
preheating at a temperature from 450 to 520° C.;
hot rolling of said homogenised plate at a temperature from 450 to 520° C. down to a thickness from 2 to 6 mm;
cold rolling to a desired thickness and
annealing at a temperature from 240 to 450° C., with holding at a maximum temperature for 10 minutes to 15 hours.

15. A method for manufacturing a strip according to claim 13, further comprising:
cladding with at least one brazing aluminium alloy, wherein the cladding step is between the step of casting and the step of preheating.

16. The method for manufacturing a strip according to claim 13, further comprising:
cladding with at least one brazing aluminium alloy and at least one interlayer aluminium alloy, wherein the cladding step is between the step of casting and the step of preheating and wherein the at least one interlayer aluminium alloy is placed between the core and the at least one brazing aluminium alloy.

17. A method for manufacturing a strip according to claim 14, further comprising:
cladding with at least one brazing aluminium alloy, wherein the cladding step is between the homogenisation step and the preheating step.

18. A method for manufacturing a strip according to claim 14, further comprising:
cladding with at least one brazing aluminium alloy and at least one interlayer aluminium alloy, wherein the cladding step is between the homogenisation step and the preheating step and wherein the at least one interlayer aluminium alloy is placed between the core and the at least one brazing aluminium alloy.

* * * * *